United States Patent
Angelo, Jr.

(10) Patent No.: US 11,185,101 B2
(45) Date of Patent: Nov. 30, 2021

(54) METHOD AND SYSTEM FOR TREATING OR PREVENTING TYPE II DIABETES AND/OR REDUCING INFLAMMATION AND BODY WEIGHT/WAIST CIRCUMFERENCE

(71) Applicant: Patrick Angelo, Jr., Park Ridge, IL (US)

(72) Inventor: Patrick Angelo, Jr., Park Ridge, IL (US)

(*) Notice: Subject to any disclaimer, the term of this patent is extended or adjusted under 35 U.S.C. 154(b) by 723 days.

(21) Appl. No.: 16/027,808

(22) Filed: Jul. 5, 2018

(65) Prior Publication Data
US 2020/0008459 A1     Jan. 9, 2020

(51) Int. Cl.
*A23L 33/00*     (2016.01)
*A23L 33/125*     (2016.01)

(52) U.S. Cl.
CPC .............. *A23L 33/30* (2016.08); *A23L 33/125* (2016.08); *A23V 2002/00* (2013.01)

(58) Field of Classification Search
CPC .... A23L 33/30; A23L 33/125; A23V 2002/00
USPC ................... 426/615, 616, 639, 648, 804, 2
See application file for complete search history.

(56) References Cited

PUBLICATIONS

"Nutrition Basics Handout", University of Virginia Health System : http://www.healthsystem.virginia.edu/diabetes, May 7, 2010, pp. 1-10. (Year: 2010).*

* cited by examiner

*Primary Examiner* — Helen F Heggestad
(74) *Attorney, Agent, or Firm* — McAndrews, Held & Malloy, Ltd.

(57) ABSTRACT

The present disclosure describes methods and systems for decreasing inflammation, overcoming addiction to processed sugars and excess carbohydrates, reversing or stabilizing diabetes, and/or reducing body weight or waist circumference in a human being by way of a dietary program. The dietary program involves a participant ingesting either (1) a prescribed formula or (2) a meal, at regular intervals between 2.5 and 4.5 hours throughout the day. The prescribed formula contains (a) between 3 g and 9 g of natural sugar provided by an appropriate serving of fruit or fruit juice, and (b) at least 8 ounces of water. Each meal may have relatively few restrictions, though in some embodiments the meal may contain a cap on the amount and/or type of carbohydrates. When the dietary program is followed for a number of successive days, participants have reported significant losses in weight and waist circumference, a significant reduction in inflammation, a reduced addiction cycle of cravings for processed sugars and excess carbohydrates, and significantly improved blood sugar levels.

18 Claims, No Drawings

METHOD AND SYSTEM FOR TREATING OR PREVENTING TYPE II DIABETES AND/OR REDUCING INFLAMMATION AND BODY WEIGHT/WAIST CIRCUMFERENCE

BACKGROUND

The present disclosure generally relates to methods and systems relating to a dietary program for decreasing inflammation, overcoming addiction to processed sugars and excess carbs, stabilizing or reversing Type II diabetes through non-therapeutic treatment, and/or reducing body weight and waist circumference in a human being.

America has a weight problem. Currently, about 70% of Americans are considered overweight and about 40% of Americans are considered obese.

There are countless number of weight-loss programs on the market that are designed to combat this problem. Many of these programs take approaches that place significant restrictions on what a user can eat. For instance, some diet programs require a user to limit the number of calories ingested per meal and/or per day, such as by using complicated point systems. Other programs require a user to give up many types of foods or macronutrients, such as carbohydrates (e.g., so-called "no carb" diets). Because of the restrictive nature of these diet programs, they are difficult for many Americans to follow for an extended period of time.

Moreover, many weight-loss programs also promote rigorous exercise as an integral part of the program. However, it is easy for a participant in a weight-loss program to lose motivation for such rigorous exercise. As a participant in the weight-loss program fails to exercise, results will lag and the participant will often quit the program altogether. Accordingly, an exercise component to a weight-loss program also makes it difficult for many Americans to follow for an extended period of time.

Further, it has presently been recognized that these diet programs fail to take into account the true nature of America's weight problem. Although many diets understand that there is a psychological component to weight problems (overweight and obesity), none of the diets have addressed the overweight/obesity epidemic as a physical addiction. The present inventor has recognized that Americans not only psychologically but also physically addicted to processed sugars and excess carbohydrates.

This addiction operates in the same manner as other addictions, such as addictions to nicotine, alcohol, heroin, cocaine, and other drugs. Namely, each addiction can be linked with a receptor site in the brain. As with other addictive substances, and without being bound by theory, it is believed that the brain has a dopamine receptor site associated with sugar. When the dopamine receptor site is stimulated by sugar, it releases dopamine. When that dopamine receptor site is not stimulated, it sends out messages that make a person crave sugar. As a result, and in order to alleviate the cravings, the person will seek to stimulate the receptor. Due to the high processed sugar content of many foods in America, the person will typically ingest more sugar and/or carbohydrates than is needed to stimulate the receptor site. While some of the ingested sugars and/or carbohydrates are used by the body for energy and to maintain the person's blood sugar level, the excess sugar and/or carbohydrates ingested by the person places the person into a state of glucose toxicity, in which the excess sugar/carbohydrates are processed and stored in the person's adipocyte (fat) cells. When the blood sugar level decreases, it leaves the receptor unstimulated, causing the person to crave additional sugar sooner than is needed. The stimulation cycle of the receptor, in association with the fluctuations in blood sugar levels, place the person into a constant cycle, or roller-coaster, between craving and ingesting processed sugars and excess carbohydrates. This roller-coaster cycle is similar to that experienced by persons afflicted with other physical addictions.

Moreover, as with other addictions, the more often and/or the more intensely the dopamine receptor is stimulated, the greater the amount of sugar or carbohydrates is needed to stimulate the receptor to obtain a desired pleasurable result. This leads to the person eating greater quantities of sugars/carbohydrates and/or eating sugars/carbohydrates more often in order to stimulate the receptor to obtain the desired pleasurable result.

The roller-coaster cycle also subjects a person to a recurrent state of glucose toxicity, which can lead to a pre-diabetic or diabetic state, i.e. Type II diabetes. When the body is in a state of glucose toxicity, the pancreas (which produces the insulin that moves blood sugar into the body's cells) is placed under stress. For instance, when a person routinely ingests excess sugars or carbohydrates, the person's fasting blood sugar level rises above a healthy range (usually defined as a blood sugar level of 70 to 99 mg/dL). In response, the pancreas produces insulin which distributes the surplus blood sugar to body cells, including adipocyte (fat) cells. The cycle of cravings and ingestion of processed sugars and excess carbohydrates causes repeated blood sugar spikes, which places the pancreas under repeated stresses. Over time, these stresses cause the insulin-producing cells in the pancreas to fatigue and/or die. As the cells fatigue and/or die, the pancreas becomes less efficient, at which point the person may enter a pre-diabetic (usually defined as a blood sugar level of 100 to 124 mg/dL) or diabetic state (usually defined as a blood sugar level above 125 mg/dL).

The addiction to processed sugars and excess carbohydrates—and the resulting cycle of ingestion and craving—also plays a primary role in America's weight and waist circumference problem, which is closely associated with chronic inflammation. It is now well-established that a person's adipocyte (fat) cells act as an endocrine organ, producing the chemicals that cause a chronic state of inflammation, such as cytokines, e.g., IL-6 (Interleukin-6), IL-8 (Interleukin-8), IL-18 (Interleukin-18), TNF-α (Tumor necrosis factoralpha), CRP (C-reactive protein), and leptin.

Specifically, when excess sugar and carbohydrates ingested by a person are processed and stored in the person's adipocyte (fat) cells, it causes those fat cells to swell. As the adipose cells swell, many of them begin to leak or burst, causing cellular debris. In response, the body sends macrophages, a type of white blood cell, to digest the released cellular debris. These macrophages release inflammation-causing chemicals. Under normal circumstances, macrophages clean up cellular debris and move on to the next job, so the impact of the resulting inflammation is short-lived. With swollen adipose tissue, however, the damage is most often ongoing (unless a person begins to shrink his/her adipocyte (fat) cells, such as through prolonged weight/waist circumference loss). The more weight a person gains, the larger the adipose cells become, and the more likely they are to leak or burst. As more adipose cells leak or burst, more macrophages are introduced, and more inflammation-causing chemicals are released. Because the ongoing inflammation cannot be contained in the fat tissue, it spills out into the body and becomes chronic and systemic.

Inflammation has been closely linked with a variety of diseases familiar to Americans, including Alzheimer's, arthritis, cancer, diabetes, depression, cardiovascular disease, and stroke Inflammation is also associated with amplified aging. Thus, rather than addressing the problem as one of weight, in some embodiments, the present inventor prefers to address the problem in terms of a person's health. In other words, weight loss need not be the priority of the methods and systems described herein, although it will certainly be a byproduct of those methods and systems. Rather, in some embodiments, the priority may be reducing waist circumference, reducing inflammation, lessening or eliminating a person's addiction to processed sugars and excess carbohydrates, reversing or stabilizing a diabetic or pre-diabetic state, and/or treating or preventing Type II diabetes.

The present invention provides methods and systems configured to assist users in lessening or overcoming an addiction to processed sugar and excess carbohydrates. In doing so, the methods and systems are designed to decrease inflammation, prevent or treat a diabetic state, and reduce body weight/waist circumference. By treating a user's addiction to processed sugars and excess carbohydrates, embodiments of the present invention provide a program that is easier for a person to maintain over time than typical diet programs. Moreover, embodiments of the present invention provide a dietary program that is more natural and less complicated than conventional dietary programs, which have not worked (as evidenced by the proportion of Americans that are considered overweight or obese). As described in more detail below, the methods and systems of the present invention also place relatively few restrictions on what a user can or cannot eat, which also contributes to an improved likelihood of program maintenance.

SUMMARY

Embodiments of the present disclosure are directed to methods for stimulating a person's dopamine receptor in a controlled manner so as to break the cycle of cravings and over-ingestion of sugars and excess carbohydrates. In order to stimulate a person's dopamine receptor with a relatively low amount of sweetness (e.g. compared to processed sugars and artificial sweeteners) in a controlled manner, a person should ingest a prescribed amount of natural sugar, such as from fruit or fruit juice, at defined intervals throughout the day. By controlled, relatively low-intensity, natural stimulation of the dopamine receptor, a less-additive dopamine response may be produced. Over time, a person will become accustomed to the controlled, lower-intensity (i.e. smaller amount of dopamine released), natural stimulation, breaking the addiction cycle of relatively intense stimulations and sugar/carbohydrate cravings necessary to bring about those intense stimulations. Therefore, after performing the methods/systems of embodiments described herein, in order to stimulate the receptor, a person will no longer need to ingest an amount of sugar/carbohydrates that will place them into a state of glucose toxicity.

Embodiments of the present disclosure are directed to methods for treating or preventing a diabetic or pre-diabetic state, e.g. by stabilizing or reversing an existing trend toward increasing blood sugar levels. In order to do so, a person should ingest a prescribed amount of natural sugar, such as from fruit or fruit juice, at defined intervals throughout the day. The prescribed amounts of natural sugar and the defined intervals may be selected so as to maintain the person's blood sugar level at a healthy level, i.e. one in which the body has sufficient blood sugar to use for energy but that avoids glucose toxicity. By avoiding blood glucose spikes in this manner, the pancreas is not placed under repeated stresses. Rather, the pancreas is kept working at the relatively low levels, i.e. producing a relatively low amount of insulin over a period of time, which allow it to work efficiently. Accordingly, embodiments of the methods/systems described herein may be useful in the non-therapeutic (i.e. not using drugs) treatment or prevention of Type II diabetes.

Embodiments of the present disclosure are directed to methods for decreasing inflammation in a person. In order to do so, a person should ingest a prescribed amount of natural sugar, such as from fruit or fruit juice, at defined intervals throughout the day. This prevents glucose toxicity events from occurring or at least minimizes the number and intensity of glucose toxicity events that occur. By minimizing glucose toxicity, embodiments of the methods/systems described herein reduce the amount of sugars and carbohydrates that are converted to fat and stored in adipose tissue, which reduces the amount of inflammation-causing chemicals produced by the adipocyte cells (for instance, as described above). Moreover, by providing a person with a diet that is relatively easy to follow, due for instance to both (a) the reduced cravings for sugar and excess carbohydrates described above and (b) the relatively few restrictions on what a user can eat, embodiments of the methods/systems described herein assist a person in shrinking his or her adipocyte (fat) cells, removing a long-term source of chronic inflammation. As a byproduct, embodiments of the methods/systems described herein are also effective as way for a person to lose weight, i.e. as a non-therapeutic slimming method.

Embodiments of the present disclosure are directed to methods for overcoming a person's addiction to processed sugars and excess carbohydrates, treating or preventing a diabetic or pre-diabetic state, decreasing inflammation in a person, and/or reducing a person's body weight and/or waist circumference. The method involves ingesting either (1) a prescribed formula that is designed to keep the person's dopamine receptor in the brain stimulated in a controlled, non-addictive manner, and to maintain the person's blood sugar at a healthy level for providing energy and avoiding glucose toxicity, or (2) a meal, the meal being limited only in that it does cause a significant blood sugar spike, at regular intervals between 2 and 5 hours, more desirably between 2.5 and 4.5 hours or between 3 and 4 hours, throughout the course of a day, excepting of course when the person is asleep. The method may be repeated for a period of successive days until desired results are achieved.

The prescribed formula preferably contains natural sugar in an amount between 3 grams and 9 grams and at least 8 ounces of water (which, it is believed, assists with an effective absorption of the sugar). By regular, low-level refreshing of the dopamine receptor with this amount of natural sugar, a person's dopamine receptor is less likely to form an addictive stimulation cycle and the person's blood sugar level is maintained within a healthy zone in which the ingested sugars are not stored in adipocyte (fat) cells, but rather sourced for energy.

In some embodiments, the natural sugar may be provided by an appropriate serving of fruit or fruit juice. The serving size of fruit or fruit juice that provides between 3 and 9 grams of natural sugar will vary depending on the identity of the particular fruit or fruit juice. In some embodiments, for instance, the method may include providing a person with a table or database of serving sizes for various fruits and/or fruit juices. Alternatively, the method may include providing a person with appropriate serving sizes of fruits and/or fruit juices. In some embodiments, the natural sugar may be provided by a supplement, such as a supplement designed to be ingested on its own, a supplement designed to be mixed with water (e.g. with at least 8 ounces of water), or a supplement contains water (e.g. at least 8 ounces of water).

There may be no limitations on what types of food may be present in each meal. Rather, the only limitation placed on each meal is that it not produce a significant spike in the person's blood sugar, i.e. a spike that would take the person well outside the healthy range and into a glucose toxicity event. In some embodiments, for instance, the only limitation placed on the meals may be that the meals each contain at maximum amount of carbohydrates. For instance, the meals may each desirably contain at most 80 grams of carbohydrates, more desirably the meals each contain at most 75 grams of carbohydrates, more desirably the meals each contain at most 70 grams of carbohydrates, more desirably the meals each contain at most 60 grams of carbohydrates. For example, it may be particularly desirable that each meal contain between 45 grams and 60 grams of carbohydrates, i.e., the range recommended by the American Diabetes Association. In other embodiments, the meal may be limited based on the type of carbohydrates provided by the meal. For instance, in some embodiments, the meal may be limited to one comprising predominantly complex carbohydrates, which are broken down more slowly by the body (relative to simple carbohydrates) and thus which will be less likely to cause blood sugar spikes. In some embodiments, the meal may be limited both by a maximum amount of carbohydrates and by a type of carbohydrates. For example, in some embodiments, each meal might contain at most 80 grams of carbohydrates, wherein the carbohydrates are predominantly complex carbohydrates.

Notably, in order to follow the method of the present disclosure, there need not be any other restriction on the composition of each meal. For example, there may be no restriction on the number of calories, the amount of fat, the amount of protein, etc. In some embodiments, however, as is described elsewhere, each meal may also have the restriction of not containing any processed sugar.

The regular intervals may be any amount of time that is at least about 2 hours, more desirably at least about 2.5 hours. In some embodiments, the intervals may desirably range between 2.5 hours and 4.5 hours. For instance, it may be particularly desirable that most of the intervals are between about 3 hours and about 4 hours.

In some embodiments, there may also be few restrictions placed on what a person may eat during the intervals between prescribed formulas and/or meals. For instance, if a person becomes hungry during an interval, the person may eat without departing from the method. The only limitation on such eating is that the mid-interval food does not contain processed sugar or carbohydrates sufficient to cause a significant blood sugar spike. For example, if a person gets hungry mid-interval, the person may be instructed to eat a natural sugar, low-carbohydrate, high-protein food, such as cashews, almonds, beef jerky, eggs, or the like. Again, in some embodiments, as is described elsewhere, the food may also have the restriction of not containing any processed sugar.

In some embodiments, there may also be no prescribed exercise component to the dietary program. While exercise is generally helpful for losing weight and increasing health, a participant in the dietary program need not exercise in order to achieve the types of results described herein. The lack of an exercise component, as well as the minimal restrictions on the types and amounts of foods that may be consumed, leads to an extremely high proportion of participants maintaining the dietary program over time with relative ease, i.e. with little to no difficulty.

Although there may be no prescribed exercise component, after participation in the dietary programs described herein for a period of time, a participant will experience a number of effects (e.g. increased energy, better mental clarity, less joint pain, etc.), which typically leads to the participant choosing to increase his/her level of physical activity. For instance, after one to two months of participation in an embodiment of the dietary program described herein, the vast majority of participants, who were previously did not exercise, have begun to exercise.

In some embodiments, the method may further include the person ingesting at least a minimum number of prescribed formulas throughout the course of the day. For instance, in some embodiments, a person may be required to ingest at least 2 prescribed formulas per day, alternatively at least 3 prescribed formulas per day, alternatively at least 4 prescribed formulas per day. In some embodiments, there may be no restrictions on how many prescribed formulas must be ingested per day, but a minimum number may be provided as a recommendation. For instance, it may be recommended that a person ingest at least 2 prescribed formulas per day, alternatively at least 3 prescribed formulas per day, alternatively at least 4 prescribed formulas per day. For instance, it may be recommended that a person ingest between 3 and 6 prescribed formulas per day.

For instance, in some embodiments, a person may ingest or it may be recommended for the person to ingest between 1 and 3 meals per day. In some embodiments, a person may ingest or it may be recommended for the person to ingest at least one meal and at least three formulas in a day, alternatively at least two meals and at least three formulas in a day. For example, a person may be instructed to ingest at least one meal and between three and six prescribed formulas in a day. In some embodiments, a person may ingest or it may be recommended for the person to ingest no more than three meals per day, alternatively no more than two meals per day.

The method of the present disclosure may be performed for any duration that is sufficient to provide results. However, while there is no limitation on the number of successive days that the method be performed, there may be a minimum number of days required to overcome the person's addiction to processed sugar and excess carbohydrates. For instance, it may be required that the method be performed for at least 4 weeks in order to overcome an addiction to processed sugar and excess carbohydrates. In some embodiments, the method may also include eliminating processed sugars from the diet for at least 4 weeks. While the elimination of processed sugars may sound difficult, the routine low-level stimulation of the dopamine receptor achieved by the method disclosed herein greatly reduces the cravings that often lead to the ingestion of those processed sugars. Therefore, the methods of the present disclosure are configured to facilitate the significant reduction or elimination of processed sugars.

In some embodiments, the method may be performed as a foundational diet, meaning that after it has been performed for a minimum period of time necessary to overcome the person's addiction to processed sugar and excess carbohydrates, the method may be followed less strictly. So long as the person does not go back to eating large amounts of processed sugars and/or excess carbohydrates, it is believed that the addiction cycle of cravings and ingestion of such materials may be broken, i.e. significantly lessened or eliminated. This enhances the likelihood of the person maintaining a diet that reduces glucose toxicity, decreases inflammation, reduces body weight and waist circumference, etc.

Embodiments of the present disclosure are also directed to methods for assisting a person to overcome an addiction to processed sugars and excess carbohydrates, treat or prevent a diabetic or pre-diabetic state, decrease inflammation, and/or reduce body weight and waist circumference. The method includes instructing and/or causing the person to ingest either (i) a serving size of fruit juice that provides between 3 grams and 9 grams of natural sugar in combination with at least 8 ounces of water or (ii) a meal having an amount and/or type of carbohydrate that will avoid a significant blood sugar spike, e.g. a meal containing a maximum amount of carbohydrates (for example at most 80 g of carbohydrates, alternatively at most 75 g of carbohydrates, alternatively at most 70 g of carbohydrates, at most 65 g of carbohydrates, alternatively at most 60 g of carbohydrates), every 2.5 to 4.5 hours (excepting of course hours spent sleeping) for a period of days. Other than the recited amount and/or type of carbohydrates, there need not be any other food restrictions placed on the meal, though in some embodiments some additional guidelines may also be provided. For instance, in some embodiments, processed sugar may be removed from the diet for a period of days. The assisting may be provided, for example, through personal consultations (e.g. human coaching), publications (e.g. books, pamphlets, etc.), websites or other online content, videos, software programs, "apps", or any combination thereof.

The method may also include providing a plurality of serving sizes of fruit or fruit juice that provide between 3 grams and 9 grams of natural sugar. In this way, a person may easily be able to obtain information regarding how much of a particular fruit or fruit juice to ingest. The serving size information may be provided through a variety of mediums, including printed documents, electronic databases, websites, smartphone "apps", coaching (e.g., personal coach, dietician, nutritionist, physician, etc.), push notifications, videos, artificial intelligence, and the like. Similarly, all instructions and information relating to assisting a person to overcome an addiction to processed sugars and excess carbohydrates, decrease inflammation, and/or reduce body weight or waist circumference may be disseminated using a variety of mediums, including for example online videos or other streamable media, television programs and advertisements, artificial intelligence, books or other printed materials, live presentations, websites, smartphone "apps", electronic databases, and the like.

Embodiments of the present disclosure are also directed to a process for assisting a person to overcome an addiction to processed sugars and excess carbohydrates, treat or prevent a diabetic or pre-diabetic state, decrease inflammation, and/or reduce body weight or waist circumference utilizing a data processing system, e.g. a computer. The process may include obtaining, as input to a data processing system, the identity of a particular fruit or fruit juice, using a processor of the data processing system to determine a serving size or range of serving sizes for the identified fruit or fruit juice that provide between 3 grams and 9 grams of natural sugar, and displaying the serving size or range of serving sizes as output. For example, a user may manually input, e.g. by typing or through voice recognition, the name of a particular fruit or fruit juice or select the particular fruit or fruit juice from a displayed listing of fruits and/or juices. Once the particular fruit or juice is input, the processor will determine a serving size or range of serving sizes associated with that particular fruit or juice and display the results, such as visually, e.g. on a screen, and/or audibly, e.g. by speaker.

The manner in which the processor determines a serving size or range of serving sizes for a particular fruit may vary. In some embodiments, the processor may identify the serving size or range of serving sizes from a database that includes serving sizes for a variety of fruit and fruit juices. That database may be stored in a memory of the data processing system or it may be stored online. In other embodiments, the processor may calculate the serving size or range of serving sizes using stored or otherwise accessible information about each fruit or fruit juice.

Embodiments of the present disclosure are also directed to a process for assisting a person to overcome an addiction to processed sugars and excess carbohydrates, decrease inflammation, and/or reduce body weight or waist circumference utilizing a data processing system, e.g. a computer, by (a) obtaining, as input, a notification that the person has ingested either (i) a serving size of fruit juice that provides between 3 grams and 9 grams of natural sugar in combination with at least 8 ounces of water or (ii) a meal containing a suitable carbohydrate component; and then (b) providing a reminder to ingest either (i) or (ii) after a period of time between 2.5 hours and 4.5 hours, preferably after a period of time of three hours or four hours. This process may be repeated throughout the day. For instance, after receiving a reminder, the person may be prompted to input a notification that the person has ingested one of (i) or (ii), which will reset the clock for the next reminder. As with other embodiments, the inputting can performed and the notifications can be provided in a variety of manners. For instance, the inputting may be performed by voice, by touch, etc., and the reminders can involve a visual notification, an audible notification, a physical notification (e.g. a vibration of a smartphone or associated device such as a smartwatch), etc.

Embodiments of the present disclosure are also directed to a system for assisting a person to overcome an addiction to processed sugars and excess carbohydrates, treat or prevent a diabetic or pre-diabetic state, decrease inflammation, and/or reduce body weight, such as by performing any of the methods/processes described herein.

In some embodiments, for instance, the system may include a computer that stores a software program having instructions which cause the computer to receive the identity of a fruit or fruit juice from a user and present to the user a serving size or range of serving sizes for the identified fruit or fruit juice that provides between 3 g and 9 g of natural sugar.

In some embodiments, the system may include a computer that stores a software program having instructions which cause the computer to receive a notification that a user has ingested (i) a serving size of fruit or fruit juice that provides between 3 g and 9 g of natural sugar in combination with at least 8 ounces of water or (ii) a meal having a suitable carbohydrate component; and after a defined period of time, e.g. between 2.5 and 4.5 hours or between 3 and 4 hours, present to the user a reminder to ingest either (i) or (ii). After presenting the reminder, the software program may also have instructions which cause the computer to prompt a user to enter such a notification once the serving size of (i) or meal of (ii) has been ingested.

DETAILED DESCRIPTION OF THE DISCLOSURE

Dietary Programs, Methods of Performing the Dietary Programs, and Methods of Assisting a Person Perform the Dietary Programs Embodiments of the present invention are directed to non-therapeutic methods and systems for overcoming addiction to processed sugars and excess carbohydrates, reducing body weight and waist circumference, decreasing inflammation, treating or preventing diabetes or pre-diabetes, and generally improving the health of a human being. This method involves the ingestion of an amount of natural sugar in combination with an amount of water at substantially regular intervals throughout the day. Through ingestion of the defined amounts of natural sugar within the defined time periods, it has been found that a human being may reduce or eliminate cravings for sugar throughout the day while keeping his or her blood sugar level within a range in which the body has sufficient blood sugar for energy and healthy functioning, but where excess sugar or carbohydrates is not stored as body fat. As the body is kept within this healthy zone, the body burns existing fat stores causing a decrease in waist circumference and weight loss. Significantly, this also brings about a decrease in the size of the adipocyte (fat) cells, less leaking and/or bursting of those adipocyte (fat) cells, less macrophages leading to a decrease in the production of chemicals that cause inflammation, and a resulting reduction of inflammation. This reduction of inflammation is a major health benefit, which may have long-lasting effects on many aspects of a person's health. Moreover, because the body is kept within this healthy zone, the requirements placed on the pancreas are relatively low, which can either help prevent a person from reaching a pre-diabetic or diabetic state or help bring a person who has already reached a pre-diabetic or a diabetic state back to a healthy blood sugar level.

Notably, a participant in the dietary program described herein may typically find it relatively easy to avoid processed sugar and excess carbohydrates (in contrast to his or her experience before participation in the program). Without being bound by theory, it is believed that a person's cravings for sugar are reduced or eliminated because the addiction-related dopamine receptor in the human brain is stimulated in a controlled, non-addictive manner. By keeping the dopamine receptor stimulated in this manner, the addiction cycle of craving and ingestion of sugar may be eliminated.

In particular, a participant may be instructed to ingest the combination of (a) a serving size of fruit or fruit juice that provides between 3 grams and 9 grams of natural sugar in combination with (b) at least 8 ounces of water. The fruit or fruit juice may be mixed with the water or the two may be ingested at the same time or separately, such as within a relatively short time period of one another.

The amount of fruit or fruit juice necessary to provide between 3 grams and 9 grams of natural sugar varies depending on the identity of the fruit or fruit juice. For instance, a person may be instructed to consume about one third of a banana in combination with at least 8 ounces of water. Alternatively, a person may be instructed to drink about two ounces of (all-natural) cranberry juice in combination with at least 8 ounces of water. Alternatively, a person may be instructed to consume about one-half of an orange in combination with at least 8 ounces of water. Aspects of the present disclosure, described in detail below, address a variety of ways in which a participant may be provided with the proper serving size for a particular fruit or fruit juice.

In some embodiments, a user may be provided with serving sizes that range from a serving size that provide 3 grams of natural sugar to a serving size that provides 9 grams of natural sugar. The participant will then be free to select a desired serving size from within the prescribed range.

In other embodiments, the amount of natural sugar associated with the serving sizes provided to a participant may vary depending on the glycemic index of the fruit. For instance, for a fruit having a relatively high glycemic index, the serving sizes provided to a participant may range from a serving sufficient to provide 3 grams of natural sugar to a serving sufficient to provide 5 grams of natural sugar. In contrast, for a fruit having a relatively low glycemic index, the serving sizes provided to a participant may range from a serving sufficient to provide 6 grams of natural sugar to a serving sufficient to provide 9 grams of natural sugar.

This embodiment takes into account the role of glycemic index in the speed at which the natural sugar is absorbed. The sugars in a fruit or fruit juice having a high glycemic index are broken down relatively quickly, leading to a faster absorption rate. In contrast, the sugars in a fruit or fruit juice having a low glycemic index are broken down relatively slowly, leading to a slower absorption rate. Since the goal is to deliver a controlled, low-level of natural sugar to the blood and to the dopamine receptor site, a participant may be provided with higher serving sizes for the slowly-absorbed, low glycemic index fruits than for the quickly-absorbed, high glycemic index fruits. As a general rule, fruit juices typically have relatively higher glycemic indexes compared to fruits because the fruit juices typically lack the fiber content of the fruit, which helps slows the absorption of glucose so that it occurs over a longer period of time (i.e. lowers the glycemic index of the fruit). For instance, the glycemic index for a grapefruit may be about 25 (on the 1-100 scale), while the glycemic index for grapefruit juice may be about 48. Therefore, in some embodiments, for a fruit juice, a participant may be provided with a serving size that provides 3-5 grams of natural sugar whereas, for a fruit, a participant may be provided with a serving size that provides 6-9 grams of natural sugar.

In yet another embodiment, the amount of natural sugar associated with serving sizes provided to a participant may be restricted to a subset of the full 3 g-9 g range. For instance, in some embodiments, the serving sizes provided to a participant may range from a serving sufficient to provide 3 grams of natural sugar to a serving sufficient to provide 7 grams of natural sugar. This embodiment takes into account the fact that many participants will tend to ingest more than the prescribed serving size. Accordingly, by providing a participant with serving sizes having an upper bound that provides less than 9 grams of natural sugar, a participant has some wiggle room in which to exceed the serving size while still remaining in the preferred 3 g-9 g range for natural sugars.

In yet another embodiment, rather than a range of serving sizes, a participant may be provided with a single serving size or a limited number of specific serving sizes for an individual fruit or fruit juice. For instance, a participant may be provided with a serving size of a particular fruit that is sufficient to provide 3 g sugar, alternatively 4 g sugar, alternatively 5 g sugar, alternatively 6 g sugar, alternatively 7 g sugar, alternatively 8 g sugar, alternatively 9 g sugar, alternatively any combination of the above (e.g., a serving size sufficient to provide 3 g and a serving size sufficient to provide 8 g).

In some embodiments, the 3-9 grams of natural sugar may be provided not by a serving of fruit or fruit juice, but rather by a supplement, such as a dietary supplement that may be provided as part of a dietary program disclosed herein. The supplement may be a useful substitute for one or more prescribed formulas. Such a dietary supplement could take on any number of compositions suitable to provide 3-9 grams of natural sugar. For instance, the dietary supplement may contain fruits and/or vegetables, juices of fruits and/or vegetables, extracts from fruits and/or vegetables, or the like in an amount suitable to provide the stated amount of natural sugar. In some embodiments, the dietary supplement may also contain additional nutritional components, such as protein, fat, or both. The dietary supplement may also contain any number of vitamins and/or minerals that are part of a healthy diet. The supplement may be a liquid composition containing the at least 8 oz. of water or the supplement may be configured to be mixed with the at least 8 oz. of water, e.g. a powder composition.

The range of 3 g to 9 g of natural sugar, in combination with at least eight ounces of water, has been determined to be the preferred amount of sugar to obtain the recited effects for the defined interval. More particularly, the recited amounts of natural sugar and water are sufficient to keep a participant's blood sugar level in the desired zone and keep the participant hydrated for at least three hours, thereby preventing the body from producing hunger signals within that time period or lessening the intensity of any hunger signals that the body produces within that time period. In contrast, the ingestion of less than 3 g of natural sugar may not provide the body with enough sugar to maintain the person's energy for 3 hours and may result in the body producing hunger signals before the desired interval has occurred. The ingestion of more than 9 g of natural sugar, especially in sequential 3 hour intervals, on the other hand, may cause the blood sugar level to spike outside of the desired zone (glucose toxicity), causing the body to convert and store the excess sugar in adipocyte (fat) cells. The at least 8 ounces of water is used to provide hydration and to assist in the absorption of the natural sugars.

However, in some embodiments, alternative ranges may be ingested or even provided to a participant. For instance, a person may ingest or be instructed to ingest up to 10 g of natural sugar, up to 11 g of natural sugar, up to 12 g of natural sugar, or the like. Or a person may ingest or be instructed to ingest at least 4 ounces of water, at least 5 ounces of water, at least 6 ounces of water, at least 7 ounces of water, at least 9 ounces of water, at least 10 ounces of water, at least 12 ounces of water, or the like.

The combination of 3 to 9 grams of natural sugar, generally provided by fruit or fruit juice, and at least 8 ounces of water is referred to herein as the prescribed formula. It is, however, contemplated that a participant may not necessarily ingest a serving size of fruit or fruit juice that provides between 3 g and 9 g of sugar at each relevant time period, despite an intent or desire to do so. As long as a participant usually ingests formulas that are within the prescribed range, a limited number of outside-of-range formulas will not have significant negative effects and the dietary program and should nevertheless be considered to fall within the scope of the present disclosure.

In general, a participant ingests and/or is instructed to ingest either the prescribed formula or a meal at regular intervals throughout the day. Generally, the regular intervals will range between every 2.5 hours and every 4.5 hours. More preferably, the regular intervals will range between every 2 and every 4 hours. Most preferably, the regular intervals will be about every 3 hours. If a participant waits until after about 4.5 hours, the participant's body is likely to be low on energy, having already used up the energy provided by the previous formula or meal. If a participant ingests a prescribed formula or a meal before about 2.5 hours, the person may cause the blood sugar to spike outside of the desired range, bringing about the storage of the excess sugars and/or carbohydrates in the adipocyte (fat) cells.

In some instances, however, a person may use up the energy provided by a prescribed formula or meal more quickly than in others. For instance, if a participant chooses to exercise within one of the intervals, it may be desirable to have that interval be on the lower side of the desired range, e.g. about 2.5 hours. Desirably, the subsequent interval would then be closer to 3 hours. Or, for example, if a participant is largely inactive during one of the intervals, it may be desirable to have that interval be on the higher side of the desired range, e.g. about 4.5 hours. Again, the subsequent interval would then desirably be closer to 3 hours.

Generally, a participant will ingest and/or be instructed to ingest either a prescribed formula or a meal at regular intervals for as long as the person is awake. Generally, the exact time of day for the intervals may thus be set based on when the participant wakes up in the morning. Because the body goes an extended period of time without food or water, it is natural for a person to wake up with hunger signals associated with lower blood sugar and dehydration. Therefore, it is generally desirable to consume a prescribed formula soon after awaking in order to bring the blood sugar within the desired zone and hydrate. For example, a participant might wake up in the morning and consume a prescribed formula at about 8:00 am. Based on that timing, the participant might consume another prescribed formula or a meal at about 11:00 am, at about 2:00 pm, at about 5:00 pm, at about 8:00 pm, and at about 11:00 pm. For instance, a participant might consume a prescribed formula at about 8:00 am, eat a meal at about 11:00 am, consume a prescribed formula at about 2:00 pm, eat a meal at about 5:00 pm, consume a prescribed formula at about 8:00 pm, and consume a prescribed formula at about 11:00 pm, before going to sleep.

As described above, a participant would generally consume either (1) a prescribed fruit or fruit juice formula or (2) a meal at regular intervals during the day. The methods described herein require relatively little in the way of dietary restrictions on the meals. In some embodiments, a participant may only be instructed to limit the amount of carbohydrates present in each meal to a reasonable serving in order to avoid significant blood sugar spikes. For instance, each meal may desirably contain at most 80 g carbohydrates, more preferably at most 75 g carbohydrates, more preferably at most 70 g carbohydrates, more preferably at most 65 g carbohydrates, more preferably at most 60 g carbohydrates. For instance, in some embodiments, a person may be instructed to limit each meal to one containing between about 45 g and about 60 g carbohydrates, as recommended by the American Diabetes Association.

In other embodiments, the type of carbohydrate may be taken into account. Complex carbohydrates are broken down more slowly by the body and thus do not cause the same type of blood sugar spikes as simple carbohydrates. Accordingly, low glycemic index foods that are made up of predominantly complex carbohydrates are preferred. In some embodiments, each meal may desirably contain predominantly complex carbohydrates. For instance, in some embodiments, each meal may desirably contain at least 60% complex carbohydrates (as a percentage of the total carbohydrates), alternatively at least 70% complex carbohydrates, alternatively at least 75% complex carbohydrates, alternatively at least 80% complex carbohydrates, alternatively at least 85% complex carbohydrates, alternatively at least 90% complex carbohydrates.

In some embodiments, the maximum amount of carbohydrates in a meal may depend on the glycemic indexes of the meal components, i.e. the complexity of the carbohydrates. For instance, the maximum amount of carbohydrates allowed for a meal may be higher where the meal contains a high proportion of complex carbohydrates (and thus has a low glycemic index) that will not cause an excessive blood sugar spike. In contrast, the maximum amount of carbohydrates in a meal may be lower where the meal contains a high proportion of simple carbohydrates (and thus has a high glycemic index) that will be quickly broken down and absorbed by the body.

There may be no other restrictions on the composition of each meal, e.g. no limits on the amount of fat, the amount of protein, the number of calories, etc.

In some embodiments, however, a participant may be instructed to follow some general guidelines on how to eat each meal. For instance, in some embodiments, a participant may be instructed to consume a portion size and then wait a defined amount of time before consuming more. Once a person has consumed a sufficient amount of food, the person's stomach will send a signal to the person's brain that it is full, which typically causes the person to stop eating. That signal, however, takes about 20 minutes to reach the person's brain. Therefore, in some embodiments, a person may be instructed to consume a portion size and then wait 20 minutes to give the person time to receive the signal that he or she is full.

Relatedly, a participant may be instructed to eat slowly in order to give the brain time to release the signal. In some embodiments, the portion size that a person may be instructed to consume before waiting the defined amount of time may vary. In some embodiments, however, a person may be instructed to consume a portion size substantially equivalent to a loosely-held fist. In general, a person's stomach is about the size of a loosely-held fist. Therefore, a person might be instructed to eat a portion designed to fill the stomach without stretching it out. If, after waiting a defined period of time, that person is still hungry, the person may continue to eat (preferably slowly) until he or she is full. It is noted that this is not portion control since there is no limit on the size of the portion that may be consumed. Rather, it is a system that is designed to give a person a better opportunity to receive a signal from the stomach before eating more than the body requires (which stretches the stomach to a larger size, requiring a greater amount of food to be filled).

Whether to have a fruit or fruit juice formula or a meal at each designated time is entirely up to the participant. In general, a participant may be instructed to eat a meal if the person feels hungry. If a person chooses not to eat a meal despite being hungry, then it becomes more likely that the person will overeat at a later time. It also becomes more likely that the person's body will store fat to use in the future, as the body plans for not being fed. Moreover, if a person chooses to eat a meal despite not being hungry, the person is likely to cause his or her blood sugar level to fluctuate outside of the desired zone, leading to storage of the excess sugar and/or carbohydrates in adipocyte (fat) cells and causing inflammation. In some embodiments, a participant may be instructed to wait a defined wait time between experiencing hunger and proceeding to eat a meal. For instance, in some embodiments, a participant may be instructed to wait at least 15 minutes after experiencing hunger before he or she begins eating, alternatively at least 20 minutes, alternatively at least 30 minutes, alternatively at least 45 minutes. This wait time may be an opportunity to reduce inflammation (and reduce body weight and waist circumference), as it is the time in which the body will use up its fat stores for energy, shrinking the adipocyte (fat) cells.

Although it may sound difficult for a person to wait a defined wait time between experiencing hunger and proceeding to eat, the dietary program described herein is configured to make it easier. Specifically, because the dietary program is configured to keep a person's blood sugar level within a healthy range throughout each interval, the hunger experienced by the person within that interval should be manageable. Moreover, because the dopamine receptor in the brain is stimulated in a controlled, non-addictive manner, cravings for sugar or excess carbohydrates should be reduced or eliminated.

Although it is up to a participant whether to ingest a prescribed formula or a meal at the defined time, it may be useful in some instance to provide some general guidelines. For instance, a participant may be instructed to ingest at least 3 prescribed formulas in a day, alternatively at least 4 prescribed formulas in a day. A participant may also be instructed to consume at least one meal, alternatively at least two meals in a day. For instance, a participant may be instructed to ingest at least one meal and at least three formulas in a day, alternatively at least two meals and at least three formulas in a day. For example, a participant may be instructed to ingest at least one meal and between three and six prescribed formulas in a day. A participant may also be instructed to ingest no more than 3 meals in a day, alternatively no more than 2 meals in a day.

The dietary program described herein should be performed for at least a period of time until desired results are achieved. Typically, body weight and waist circumference will start to be reduced within the first few days. Similarly, a reduction in inflammation (as evidenced by decreased joint pain) has been found noticeable within four to eight days after beginning participation in the dietary program. In some embodiments, the dietary program may be performed for a minimum of at least three days, alternatively at least one week, alternatively at least two weeks, alternatively at least three weeks, alternatively at least four weeks. Most desirably, the dietary program is performed indefinitely (which, for the reasons described herein has been found relatively easy to do by participants).

In some embodiments, particularly where overcoming an addiction to processed sugars and excess carbohydrates is a priority, the method may be performed for at least about four weeks, during which the participant may be instructed to eliminate processed sugar for his or her diet. It has been found that the combination of (1) eliminating processed sugar from the diet and (2) the controlled stimulation of the dopamine receptor using the prescribed formulas described herein produces especially effective results in reducing or eliminating the cravings for processed sugar and excess carbohydrates associated with addiction.

In some embodiments, a participant may re-introduce processed sugars to the diet after the initial four week period, although the intake of processed sugars should be carefully monitored to avoid re-entry into the addictive cycle. In many instances, however, a participant may choose not to re-introduce processed sugars because (a) the cravings previously associated with addiction have been reduced or eliminated and (b) ingestion of larger amounts of sugar, such as through processed sugars, will actually cause the participant's body to send signals designed to cause the participant to return to the dietary program. For instance, once a participant has been following the dietary program described herein for a minimum period of time, e.g. four weeks, if that participant deviates from the program for a number of days, e.g. 2 to 4 days, the participant will feel unhealthy, including such signals as a noticeable increase in inflammation (e.g. joint pain), a lack of energy and/or mental clarity, a bloated feeling, a noticeable increase in waist circumference and/or body weight, etc. If the participant returns to the dietary program, however, those signals will rapidly lessen within a 48 to 72 hour period. Notably, the participant's body weight and waist circumference typically returns to the pre-deviation values within that same time period.

In some embodiments, a participant may be instructed to ingest processed sugars infrequently or to try to exclude them altogether.

Embodiments of the present disclosure are also directed to a method of performing a non-therapeutic decreasing of inflammation, a non-therapeutic overcoming of an addiction to processed sugars and excess carbs, a non-therapeutic reversing or stabilizing of diabetes, and/or a non-therapeutic reduction in body weight or waist circumference, the method including ingesting either (1) a prescribed formula or (2) a meal, at regular intervals between 2.5 and 4.5 hours, excluding hours spent sleeping, wherein the prescribed formula contains between 3 g and 9 g of natural sugar and at least 8 ounces of water; wherein the 3 g and 9 g of natural sugar is provided by fruit or fruit juice; and wherein each meal comprises at most 80 g carbohydrates; and repeating the method for a period of successive days until the result is achieved.

Computerized Applications/Methods of Assisting Participants in Dietary Programs

Embodiments of the present disclosure are also directed to processes for assisting a person in decreasing inflammation, overcoming addiction to processed sugars and excess carbs, reversing or stabilizing diabetes, and/or reducing body weight or waist circumference, which utilize a data processing system. These embodiments may be practiced by any data processing system including, for example, a personal computer, a tablet computer, a smartphone, a wearable computing device (e.g. a smartwatch), or the like. The processes described herein are configured to assist a person in practicing embodiments of the dietary program disclosed herein. Namely, the processes described herein are configured to assist a participant with (1) determining the proper amount of a fruit or fruit juice for a prescribed formula, (2) determining an acceptable serving of carbohydrate-containing components in a meal, (3) determining when it is time to ingest one of a prescribed formula and a meal, or any combination of (1) to (3).

In some embodiments, the process may be configured for a participant to be able to use a software program, including for example an "app", a website, or the like, to obtain assistance in decreasing inflammation, overcoming addiction to processed sugars and excess carbs, reversing or stabilizing diabetes, and/or reducing body weight or waist circumference. The software program may be operated and performed by a data processing system, i.e. a computer.

In some embodiments, the process may include assistance for a participant to determine the appropriate serving size for a particular fruit or fruit juice for consumption as part of a prescribed formula as described herein. For instance, the process may include obtaining an identified fruit or fruit juice as input to a data processing system; determining a serving size or range of serving sizes for the identified fruit or fruit juice via a processor of the data processing system, the serving size or range of serving sizes providing between 3 g and 9 g of natural sugar; and displaying the serving size or range of serving sizes as output.

In many instances, a participant, i.e. a user of the program, may have a particular fruit or fruit juice that he or she wishes to consume. He or she may not, however, know exactly how much of that fruit or fruit juice provides between 3 grams and 9 grams of natural sugar. Accordingly, the user may initiate the program and input the identity of the fruit or fruit juice. The inputting of that information may be performed by any of a variety of known manners, such as typing, voice activation (speaking), selecting from a list, etc. For example, in some embodiments, a user may be presented with a first choice of fruit or fruit juice and, after selecting one of the two options, the user may be presented with a second choice from a list of identified fruits or juices. In other embodiments, a user may simply be able to say the name of the fruit, e.g. "banana", or fruit juice, e.g. "cranberry juice", and the program may be configured to recognize the spoken names.

After the identity of the fruit or fruit juice is input, the program may be configured to determine an appropriate serving size or range of serving sizes—i.e. one or more serving sizes that provide between 3 grams and 9 grams of natural sugar—for the identified fruit or fruit juice, such as via a processor of the data processing system. In some embodiments, the processor may utilize a database that includes serving sizes for a variety of fruit and fruit juices. The database may be stored in a memory of the data processing unit or the database may be accessed through the Internet.

The one or more appropriate serving sizes for the identified fruit or fruit juice may then be provided to the user, such as through a visual display, a voice over speaker, or a combination of the two.

In some embodiments, the process may include assistance for a participant to determine an acceptable serving of carbohydrate-containing components in a meal, as described herein. For instance, the program may be configured to obtain, as input, the identity of a meal or a component of a meal; determine an amount of carbohydrates provided by the identified meal or component of a meal; and provide, as output, the amount of carbohydrates. The inputting of the meal component may be performed in any of the same manners as is described above for inputting the identity of a fruit or fruit juice. Similarly, the program may be configured to determine the amount of carbohydrates by reference to a database, e.g. stored in a memory, accessed through the Internet, etc. And the output may be provided visually, audibly, or both.

In some instances, a user may be able to input a meal or a component of a meal and the system may be able to either determine the amount of carbohydrates or ask follow-up questions necessary to determine the amount of carbohydrates. For instance, a user may input "hamburger" and the system may be configured to ask the user if the hamburger is on a bun, to identify the toppings on the hamburger, etc. Using the responses to those questions, the program may be configured to determine the carbohydrate content of the hamburger. In some instances, a user may also be prompted to input a serving size for the meal or meal component. For instance, a user may input "pizza" and the system may be configured to ask the user the type or style of pizza, how many slices, the size of the slices (e.g. large, small, medium), etc.

In some embodiments, a user may be prompted to input the identity of multiple components of a meal. For instance, after a user provides the necessary information for a first meal component, the program may prompt the user if there are other meal components and/or prompt the user to input another meal component. The program may determine the amount of carbohydrates associated with each identified component. The program may repeat the steps of obtaining meal components and determining the amount of carbohydrates provided by each component until the user has input each component. Once the user has indicated that each meal component has been entered, the program may provide the user with the total amount of carbohydrates provided by the meal.

In some embodiments, the program may also be configured to provide one or more recommendations. For instance, if the amount of carbohydrates for an entered meal is greater than a maximum allowed value, as described herein, the program may be configured to determine one or more steps that the user could take in order to reduce the amount of carbohydrates to a value within the permitted range and then provide, as output, the one or more recommendations. This determination may be made using any of a variety of algorithms and/or by artificial intelligence. For instance, if the input meal included two slices of bread and a baked potato, the program could recommend that the user reduce the meal to include a single piece of bread and half of the baked potato, that the user simply eliminate the bread, etc.

In yet other embodiments, the program may be configured to determine an appropriate serving size for one or more meal components. For instance, as described above, a user may be prompted to input the identity of a meal component and the program may determine an amount of carbohydrates provided by the identified component. However, rather than prompt the user to input the serving size, the program may be configured to determine a recommended serving size for each component, wherein the recommended serving sizes of the components, taken together, provide an amount of carbohydrates that is less than a maximum permitted value for the meal, as described herein. As above, this determination may be performed using any of a variety of algorithms and/or artificial intelligence. For instance, a user may input chicken, fries, and salad with vinaigrette dressing and the program may recommend a quarter chicken, a certain amount of fries, and a medium salad, which would provide, e.g., less than 60 grams of carbohydrates. The recommended serving sizes may also (or alternatively) be shown visually, which may be particularly effective since it may be difficult to effectively describe some serving sizes in words.

In some embodiments, the program may also be configured to make one or more recommendations, e.g. determine an appropriate serving size for one or more meal components, that takes into account the relative glycemic responses caused by the carbohydrates for each of the entered meal or meal components. For instance, low glycemic index carbohydrates/components are broken down quickly by the body and are more likely to lead to blood sugar spikes. High glycemic index carbohydrates/components are broken down slowly by the body and are less likely to lead to blood sugar spikes. Accordingly, rather than simply determining the total amount of carbohydrates provided by each identified meal or meal component, the system may determine both an amount of carbohydrates provided by the identified component and the glycemic response associated with those carbohydrates, e.g. a glycemic index of the identified component. As such, the output may include one or more recommendations for reducing the blood sugar spike that will result from the meal that are not solely based on reducing the total amount of ingested carbohydrates. For instance, rather than simply reducing the total amount of ingested carbohydrates, at least one of the recommendations may involve selectively reducing the amount of (or eliminating altogether) the components having the highest glycemic indexes in order to prevent a blood sugar spike.

In some embodiments, the process may include assistance for a participant to remember when an interval has run out or is about to run out, i.e. when it is appropriate to consume either a prescribed formula or a meal. For instance, the program may be configured to obtain, as input, a notification that a participant has consumed a prescribed formula or a meal according to the dietary program described herein. For instance, a participant may consume a prescribed formula upon waking in the morning. After doing so, the participant may enter that information as input. The user may enter that information in any of the variety of ways described elsewhere herein, e.g. by typing, by touchscreen, by voice, etc. The program may then determine the time at which a desired interval, e.g. an interval between 2.5 hours and 4.5 hours as described herein, will have passed. Once the desired interval has passed and/or at a defined time before the interval has passed, the program may be configured to provide the user with a reminder, i.e. a notification, that it is time (or that it is almost time) to consume either a prescribed formula or a meal. The notification may be provided in any of variety of manners, including for example, a pop-up on a visual display (e.g. on a smartphone or wearable device), an audible signal, a tactile signal (e.g. vibration of a smartphone or wearable device), or a combination thereof.

In some embodiments, the program may be configured to perform a combination of the above-described processes. For instance, in some embodiments, the program may be configured to perform each of the above-described processes.

Systems for Assisting Persons in the Dietary Programs

Embodiments of the present disclosure are also directed to a system, such as a computing system, that is configured to implement any of the methods described herein.

For example, embodiments of the present disclosure are also directed to a system for assisting a person in decreasing inflammation, overcoming addiction to processed sugars and excess carbs, reversing or stabilizing diabetes, and/or reducing body weight or waist circumference. The system may comprise a computer that stores a software program having instructions that cause the computer to receive the identity of a fruit or fruit juice from a user and present to the user a serving size or range of serving sizes for the identified fruit or fruit juice that provides between 3 g and 9 g of natural sugar.

As another example, system may comprise a computer storing a software program having instructions that cause the computer to receive an input notification that a user has ingested a serving size of fruit or fruit juice that provides between 3 g and 9 g of natural sugar in combination with at least 8 ounces of water or a meal having an amount of carbohydrates less than a maximum prescribed amount. The software program may also cause the computer to, after a period of time between 2.5 and 4.5 hours, present to the user a reminder to ingest either (i) a serving size of fruit or fruit juice that provides between 3 g and 9 g of natural sugar in combination with at least 8 oz. of water or (ii) a meal having an amount of carbohydrates less than a maximum prescribed amount.

In various embodiments, the computing system may correspond with one or more PCs, and/or user communication devices, among other things. In various embodiments, the computing system may be a mobile device, for example, such as a smartphone or a tablet. The computing system may include a display, a processing unit, memory, user input device(s), and communications connection(s), among other things. Components of the computing system may be implemented in software, hardware, firmware, and/or the like. The various components of the computing system may be communicatively linked. Components of the computing system may be implemented separately and/or integrated in various forms. For example, the display and the user input device may be integrated as a touchscreen display.

The display may be any device capable of communicating information to a user. For example, a display may include a liquid crystal display, a light emitting diode display, and/or any suitable display for providing visual information. The display may also include a speaker or other suitable component for providing audible information. The display can be operable to display information from a software application, such as a dietary assistance application, or any suitable information. In various embodiments, the display may display information provided by the processing unit, for example.

The processing unit (or processor) may be one or more central processing units, microprocessors, microcontrollers, and/or the like. The processing unit may be an integrated component, or may be distributed across various locations, for example. The processing unit may be capable of executing a software application, receiving input information from a user input device and/or communication connection(s), and generating an output displayable by a display, among other things. The processing unit may be capable of executing any of the method(s) and/or set(s) of instructions described and/or illustrated herein in accordance with the present invention, for example. In certain embodiments, the processing unit may communicate via communication connection(s) with servers to execute a dietary assistance application, for example.

The memory may be one or more computer-readable memories, for example, such as a hard disk, floppy disk, CD, CD-ROM, DVD, compact storage, flash memory, random access memory, read-only memory, electrically erasable and programmable read-only memory and/or any suitable memory. The memory may include databases, libraries, sets of information, or other storage accessed by and/or incorporated with the processing unit, for example. The memory may be able to store data temporarily or permanently, for example. The memory may be capable of storing data generated by the processing unit and/or instructions readable by the processing unit, among other things. In various embodiments, the memory stores information related to a dietary assistance application, for example.

The user input device(s) may include any device(s) capable of communicating information from a user and/or at the direction of the user to the processing unit of the computing system, for example. The user input device(s) may include button(s), a touchscreen, near field communication (NFC) readers, radio frequency identification (RFID) readers, motion tracking, orientation detection, voice recognition, a mousing device, keyboard, camera, and/or any other device capable of receiving a user directive. In certain embodiments, one or more of the user input devices may be integrated into other components, such as the display, for example. As an example, user input device may include a touchscreen display.

In various embodiments, the information provided by the user input device(s) to the processing unit may be processed by the processing unit to execute a dietary assistance application, for example. As an example, button depressions, touchscreen selections, computer system orientation and/or movement detections, and/or voice commands, among other things, may be received from the user input device(s) and processed by the processing unit and/or servers to trigger a dietary assistance application or set of actions.

In some embodiments, the system may also include a wearable or implantable biomarker. For instance, in some embodiments, the system may be configured to receive data from a biomarker that can monitor a person's blood sugar levels. The system may be configured to display the results of that blood sugar monitoring. The system may also be configured to compare those measured blood sugar levels against a variety of parameters and provide a notification to a user, e.g. if the blood sugar levels stray from within the desired range.

It should be understood that the use of the singular tense in describing any of the above devices is also meant to encompass a plurality of devices. For instance, reference to a processor is not limited to a single processor but would encompass one or more processors.

EXAMPLES

A number of individuals have participated in a program described herein, to significant long-term results. By participating in the program, each of the individuals was instructed to ingest either (1) a prescribed formula containing between 3 g and 9 g of natural sugar sourced from fruit or fruit juice in combination with at least 8 ounces of water or (2) a meal containing at most 80 g carbohydrates and preferably at most 60 g carbohydrates, at regular intervals between 2.5 and 4.5 hours and preferably between 3 and 4 hours. Each of the individuals followed those instructions for a period of successive days. The details associated with each individual are described in greater detail in the following examples and summarized in Table 1.

Example 1

Participant A, a 44 year old male, had a waist circumference of 48 inches and weighed 217 pounds prior to participation in the program described above. Participant A was suffering from chronic moderate to severe shoulder pain due to clinical inflammation, which occasionally required cortisone shots from his physician. After less than one month, Participant A no longer experienced shoulder pain, as the inflammation in the joint was reduced to a sub-clinical event. After almost ten months of participation, Participant A had a waist circumference of 42 inches and weighed 183 pounds. This corresponds to a 12.5% reduction in waist circumference and a 15.6% reduction in weight. Participant A also reported a 40% increase in productivity at work and a 100% increase in energy, and a definitive positive influence on mental clarity and mood.

Example 2

Participant B, a 70 year old male, had a waist circumference of 46 inches and weighed 240 pounds prior to participation in the program described above. After about nine months of participation, Participant B had a waist circumference of 37 inches and weighed 195 pounds. This corresponds to a 19.5% reduction in waist circumference and an 18.75% reduction in weight. Participant B reported that he lost about 12 pounds after participation for one month. Participant B also reported that prior to participation in the program, he did not have the energy or motivation to exercise. Participant B reports that he now exercises regularly, due to increased energy and mood.

Example 3

Participant C, a 39 year old male, had a waist circumference of 40 inches and weighed 206 pounds prior to participation in the program described above. After eight months of participation, Participant C had a waist circumference of 34 inches and weighed 180 pounds. This corresponds to a 15.0% reduction in waist circumference and a 12.6% reduction in weight. Participant C reported having significant fluctuations in energy levels throughout the day. Participant C reported having a more constant energy level throughout the day. Participant C also reported an increase in productivity of at least one-third. Participant C also reported that the program had brought about a significant improvement in mental clarity and mood.

Example 4

Participant D, an 80 year old male, had a waist circumference of 42 inches and weighed 187 pounds prior to participation in the program described above. Participant D was suffering from high cholesterol and was taking cholesterol lowering medication. Specifically, Participant D was taking one 10 mg dosage of Ezetimibe per day. After almost eight months of participation, Participant D ceased taking any cholesterol lowering medication and was no longer suffering from high cholesterol. This demonstrates that embodiments of the dietary program described herein can be used to reduce or eliminate cholesterol-lowering medication. After almost eight months of participation, Participant D had a waist circumference of 34 inches and weighed 165 pounds. This corresponds to a 19.0% reduction in waist circumference and an 11.7% reduction in weight.

Example 5

Participant E, a 64 year old male, had a waist circumference of 49 inches and weighed 280 pounds prior to participation in the program described above. Participant E had been suffering from Type II diabetes for about eighteen years. Prior to participation, Participant E took five shots of insulin per day (one 100 unit dose upon waking in the morning, one 26 unit dose at each of his three meals, and one 100 unit dose in the evening), three Metformin (850 mg dosage) throughout each day (e.g. morning, afternoon, evening), and one dose (1.5 mg) per week of dulaglutide (Trulicity®). Participant E had been taking Metformin for eighteen years and insulin for about eight years. After about 7 weeks of participation, Participant E ceased taking all of the above-identified medications. This demonstrates that embodiments of the dietary program described herein can be used to reduce or eliminate diabetes medication.

Prior to participation, Participant E's average blood glucose level upon waking in the morning was 250-300 mg/dl. After about three and half months, Participant E's average blood glucose level upon waking in the morning was 102 mg/dl, which then drops below 100 for most of the day. Accordingly, after about three and half months of participation, Participant E has gone from a diabetic state to a non-diabetic state.

The non-therapeutic treatment of Participant E's diabetes using the dietary program of the present disclosure is also demonstrated by Participant E's improved A1C levels. In general, an A1C level below 5.7 percent is considered normal, an A1C level between 5.7 and 6.4 percent signals prediabetes, an A1C level over 6.5 percent is considered diabetic. For many people with Type 2 diabetes, the goal is to lower A1C levels to a healthier percentage. Prior to participation, Participant E was given a hemoglobin A1C test and was found to have an A1C level of 8.6. After two months of participation in the program described above, Participant E was again given a hemoglobin A1C test and was found to have an A1C level of 6.8. After four months of participation in the program described above, Participant E was given another hemoglobin A1C test and was found to have an A1C level of 5.1. Thus, according to A1C levels, Participant E has gone from a diabetic state to a non-diabetic state after only four months of participation in the dietary program described herein.

Prior to participation, Participant E also had high blood pressure. Participant E had been taking two 5 mg Toprol-XL capsules per day (one in the morning and one in the evening) and had an average blood pressure of 120 over 80. After about 4 months of participation, Participant E has a lower blood pressure of 92 over 54 and is now taking only one Toprol-XL per day. This demonstrates that embodiments of the dietary program described herein can be used to reduce or eliminate blood pressure medication.

Moreover, after about four months of participation, Participant E had a waist circumference of 40 inches and weighed 232 pounds. This corresponds to a 18.4% reduction in waist circumference and a 17.1% reduction in weight.

The results of these examples are summarized in Table 1:

TABLE 1

| | Duration | Starting Waist | Current Waist | Waist Reduction | Starting Weight | Current Weight | Weight Reduction |
|---|---|---|---|---|---|---|---|
| A | ~10 mo. | 48 in. | 42 in. | 12.5% | 217 lb. | 183 lb. | 15.6% |
| B | ~9 mo. | 46 in. | 37 in. | 19.5% | 240 lb. | 195 lb. | 19.75% |
| C | ~8 mo. | 40 in. | 34 in. | 15.0% | 206 lb. | 180 lb. | 12.6% |
| D | ~8 mo. | 42 in. | 34 in. | 19.0% | 187 lb. | 165 lb. | 11.7% |
| E | ~4 mo. | 49 in. | 40 in. | 18.4% | 280 lb. | 232 lb. | 17.1% |

Additionally, after participating in the program, each of the individuals described in Examples 1 through 5 reported the following: (i) he was having little difficulty maintaining the program, (ii) he was continuing to either reduce weight and waist circumference or maintain the lost weight and waist circumference, (iii) he was experiencing reduced or eliminated joint pain, (iii) he had increased energy, (iv) he experienced improved mental clarity, (v) he experienced less impatience and felt more calm, (vi) he felt as though he was making better decisions, and (vii) he had increased motivation to exercise.

After about four days, each of the Participants reported that his wrists, hands, fingers, elbows, and shoulders felt less joint pain. Pure weight loss typically results in a lessening of pain in weight-bearing joints, e.g. ankles, knees, hips, etc. However, the lessening of joint pain in these non-weight-bearing joints demonstrates a reduction in inflammation.

Based on the above-identified Examples, it can be seen that the methods and systems described herein are effective for decreasing inflammation, overcoming addiction to processed sugars and excess carbohydrates, treating or preventing Type-II diabetes, and reducing body weight and waist circumference in a human being.

It can be seen that the described embodiments provide a unique and novel methods and systems having a number of advantages over those in the art. While there is described herein certain specific elements embodying the invention, it will be manifest to those skilled in the art that various modifications and rearrangements of the elements may be made without departing from the spirit and scope of the underlying inventive concept and that the same is not limited to the particular forms herein shown and described except insofar as indicated by the scope of the appended claims.

What is claimed:

1. A method for decreasing inflammation, overcoming addiction to processed sugars and excess carbohydrates, reversing or stabilizing diabetes, and/or reducing body weight or waist circumference in a human being comprising:
ingesting either (1) a prescribed formula or (2) a meal, at regular intervals between 2.5 and 4.5 hours,
wherein the prescribed formula contains
(a) between 3 g and 9 g of natural sugar, the 3 g and 9 g of natural sugar being provided by fruit or fruit juice, and
(b) at least 8 ounces of water, and
wherein each meal comprises no more than 80 g carbohydrates of which at least 90% are complex carbohydrates, and
wherein at least 3 prescribed formulas are ingested in a day; and
repeating for a period of successive days.

2. The process of claim 1, wherein each meal comprises at most 80 g carbohydrates.

3. The process of claim 2, wherein each meal comprises at most 60 g carbohydrates.

4. The process of claim 1, wherein there are no restrictions on the composition of each meal other than the recited carbohydrate component.

5. The process of claim 1, wherein the prescribed formula contains between 3 g and 7 g of natural sugar.

6. The process of claim 5, wherein the prescribed formula contains between 3 g and 5 g of natural sugar.

7. The process of claim 1, wherein the regular intervals are between 3 and 4 hours.

8. The process of claim 1, further comprising ingesting at least 4 prescribed formulas in a day.

9. The process of claim 1, further comprising ingesting at most 3 meals per day.

10. The process of claim 1, further comprising ingesting at least 1 meal and at least 3 prescribed formulas in a day.

11. The process of claim 10, further comprising ingesting between 3 and 6 prescribed formulas in a day.

12. The process of claim 1, wherein the method is performed for at least four weeks.

13. The process of claim 12, further comprising eliminating processed sugars from the diet for at least four weeks.

14. The process of claim 1, further comprising limiting the intake of sugars and carbohydrates during the intervals.

15. The process of claim 14, wherein there are substantially no dietary restrictions during the intervals other than the limiting of sugars and carbohydrates.

16. The method of claim 1, wherein each meal comprises no more than 60 g carbohydrates of which at least 90% are complex carbohydrates.

17. A method for assisting a person in decreasing inflammation, overcoming addiction to processed sugars and excess carbs, reversing or stabilizing diabetes, and/or reducing body weight or waist circumference comprising:
providing a plurality of serving sizes of fruit or fruit juice that provide between 3 g and 9 g of natural sugar,
instructing the person to ingest either (i) a serving size of fruit or fruit juice that provides between 3 g and 9 g of natural sugar in combination with at least 8 oz. of water or (ii) a meal containing no more than 80 g carbohydrates of which at least 90% are complex carbohydrates every 2.5 to 4.5 hours, and at least three of the (i) serving size of fruit or fruit juice that provides between 3 g and 9 g of natural sugar in combination with at least 8 oz. of water in a day, for a period of days.

18. The method of claim 17, wherein each meal contains no more than 60 g carbohydrates of which at least 90% are complex carbohydrates.

\* \* \* \* \*